United States Patent [19]

Nääppä

[11] Patent Number: 4,969,992
[45] Date of Patent: Nov. 13, 1990

[54] SEPARATING CONVEYOR

[75] Inventor: Tapio Ilmari I. Nääppä, Espoo, Finland

[73] Assignee: Outokumpu Oy, Helsinki, Finland

[21] Appl. No.: 55,069

[22] Filed: May 28, 1987

[30] Foreign Application Priority Data

Jun. 17, 1986 [FI] Finland ................... 862567

[51] Int. Cl.<sup>5</sup> ............................. B01D 29/64
[52] U.S. Cl. .................... 210/159; 210/162; 210/413
[58] Field of Search ........... 210/159, 162, 413; 209/257

[56] References Cited

U.S. PATENT DOCUMENTS

| | | | |
|---|---|---|---|
| 452,595 | 5/1891 | Correll | 210/413 |
| 1,180,798 | 4/1916 | Spoor | 210/413 |
| 2,823,802 | 2/1958 | Massey | 210/162 |
| 3,464,558 | 9/1969 | Harvanek et al. | 210/159 |
| 4,329,230 | 5/1982 | Quin | 210/413 |

FOREIGN PATENT DOCUMENTS 2248861 5/1974 Fed. Rep. of Germany ...... 210/159
124506 7/1983 Japan ................................ 210/413

OTHER PUBLICATIONS

"Webster's Ninth New Collegiate Dictionary", Merriam-Webster Inc., 1984, p. 1003.

Primary Examiner—Richard V. Fisher
Attorney, Agent, or Firm—Dellett, Smith-Hill and Bedell

[57] ABSTRACT

The invention relates to a separating conveyor for separating solid materials from liquids. According to the invention, above the conveying path (17) of the conveyor and essentially supported against the conveying path (17) there is arranged a grate (1) which at least at one end is connected to the conveyor by means of elastic members (2). In addition to this, the conveying path (17) is provided with members (6) in order to guide the grate and the solid materials.

10 Claims, 2 Drawing Sheets

SEPARATING CONVEYOR

BACKGROUND OF THE INVENTION

The present invention relates to a conveyor for separating solid materials from liquid materials.

In order to protect the environment, the current tendency is to treat all material classified as waste so that it in its final form causes as little damage to the nature as possible. For transport into a waste treatment plant, such material is usually packed into sheet metal barrels. In order to ensure that the successive treatment, even in the case of poisonous waste materials, should take place in the least hazardous fashion, the transport barrels are advantageously torn open before the waste treatment proper. In that case a number of various-sized pieces of sheet metal from the torn transport barrels is mixed into the waste material to be treated, which already may contain different solid particles such as waste cotton, filter elements for paint, bolts, nuts, various solid substance lumps and solvents mists in addition to other materials. However, in the further treatment the accumulated solid materials give rise to a danger of blocking, and as a result of possible blocking, also a danger of explosion and fire. Therefore the solid materials contained in the waste must be removed before the waste treatment proper.

It is apparent from the above description that the solid materials contained in waste may include an extremely wide range of ingredients as regards their specific gravity, in which case the separation of the solid materials is troublesome and creates substantial problems in that the employed for separation equipment wears very quickly.

The purpose of the present invention is to achieve an apparatus which eliminates some of the drawbacks of the prior art, so that by employing the said apparatus the extremely non-homogeneous solid materials, as regards their density, which are contained in the liquid waste can be separated from the material entering further treatment advantageously already during the conveyance, so that the non-homogeneous solid materials do not create particular wearing problems to the equipment employed. The essential novel features o the invention are apparent from the appended patent claim 1.

SUMMARY OF THE INVENTION

According to the invention, above the separating conveyor, essentially supported against the conveyor path, there is installed a grate parallel to the conveyor path and advantageously formed of at least two grate irons. At least the bottom end of the grate is attached to the supporting structures of the conveyor. The connecting member !s advantageously provided with an elastic mechanical power member, which keeps the grate in place during an advantageous operation of the apparatus, but which at the same time prevents the conveyor from breaking in case of possible disturbances caused by solid materials. The conveying path of the separating conveyor of the invention is advantageously formed of transversal beams which are further provided with members having a plurality of lugs in order to guide the grate located in the vicinity of the conveying path in the various stages of operation of the conveyor.

The members fitted on the conveyor path of the separating conveyor of the invention are advantageously designed so that they extend essentially higher than the plane surface formed by the grate irons. Thus these members, i.e. lugs, can also be employed as solid material separating members during the conveying operation. Moreover, the grate iron guide members are utilized for maintaining the gaps between the separate grate irons essentially clear of the various solid material components. Thus the liquid substance contained in the transported material is discharged through the grate irons, and only the solid material contained in the waste is left on the iron grates.

From the separating conveyor of the invention, the solid material is conducted, by aid of the advantageously designed grate irons which give the solids an angle directed outwards, into a drop funnel provided with separate feeding facilities by means of which the solid material is conducted into further treatment, for instance in order to transform the waste into a storable form.

Consequently, by employing the apparatus of the present invention, there is achieved among other things the separation of the solid components contained in a material classified as waste, from the surrounding liquid phase during the conveying operation so that in the separation process, the important gaps between the grate irons are kept clear of the solid material in order to separate the liquid essentially advantageously from the solid material, whereafter the solids can be fed into the successive further treatment without a separate drying stage. In addition to this, in the apparatus of the invention the danger of blocking caused by the non-homogeneous solid materials—as regards their weight and specific weight—is prevented by aid of the advantageous elastic installation of the grate.

BRIEF DESCRIPTION OF THE DRAWINGS

In the following the invention is explained in more detail with reference to the appended drawings, where.

DETAILED DESCRIPTION

Figure 1:
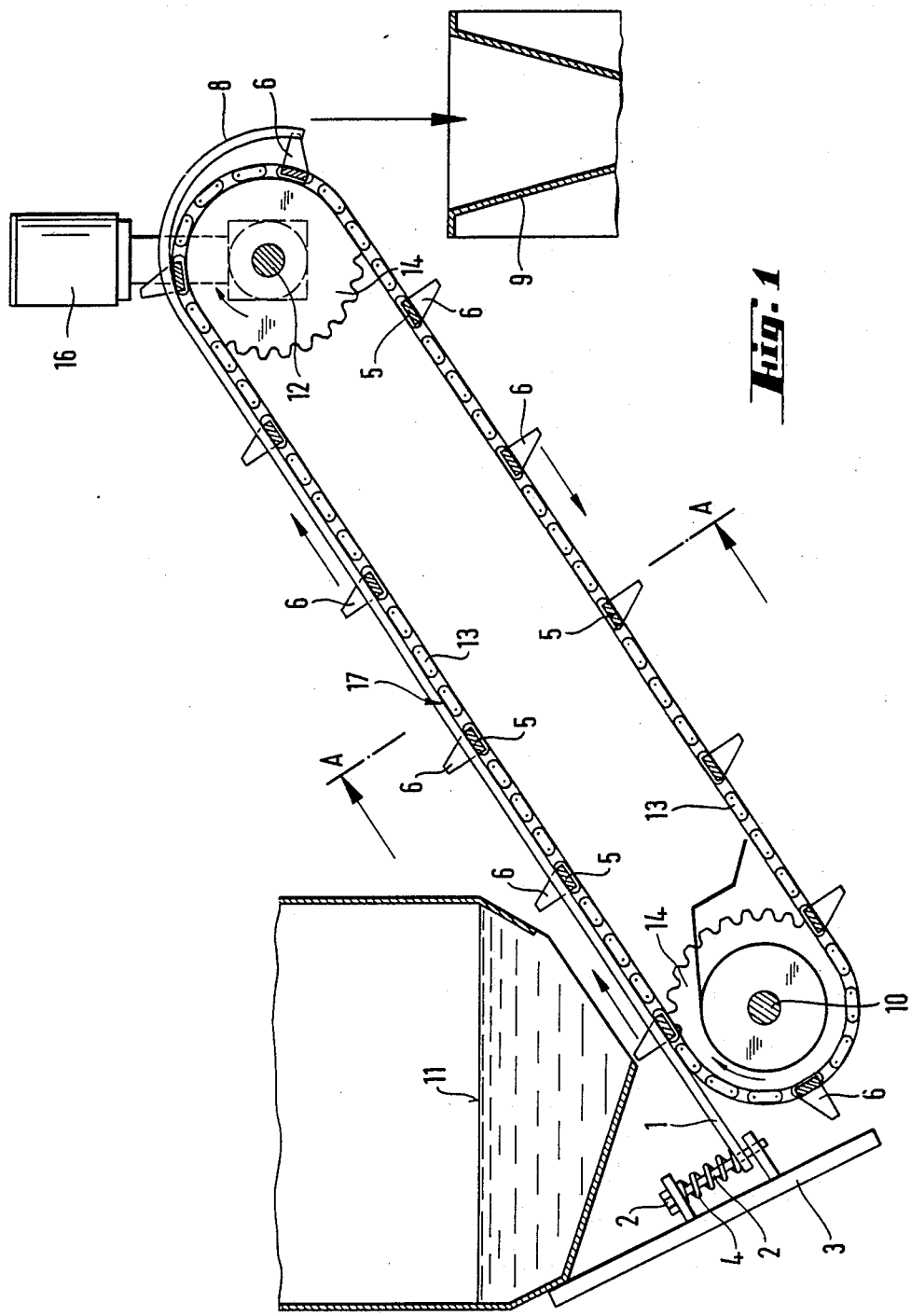
FIG. 1 is an illustration of a preferred embodiment of the invention, seen from the side.

In FIG. 1, the grate irons 1 forming the grate of the apparatus of the invention are at the bottom end attached with bolts or rods 2 to the supporting structures 3 of the conveyor. The bolts 2 are advantageously transversal with respect to the grate irons 1, and around the said bolts there are fitted springs 4. Thus the springs 4 press the grate irons 1 elastically against the transversal beams 5 forming the conveying path 17 o: the conveyor. The elastic joint of the grate irons 1 to the supporting structures 3 is advantageous because if a lump of solid material happens to fall in between the grate irons 1 and the transversal beams 5, the grate irons 1 can rise up and thus prevent the conveyor from blocking. As regards their other parts, the grate irons 1 are essentially suppported against the transversal beams forming the conveying path of the conveyor of the invention, and the movements of the grate Irons I are controlled by means of the guiding members 6 connected to the transversal beams 5.

Figure 2:
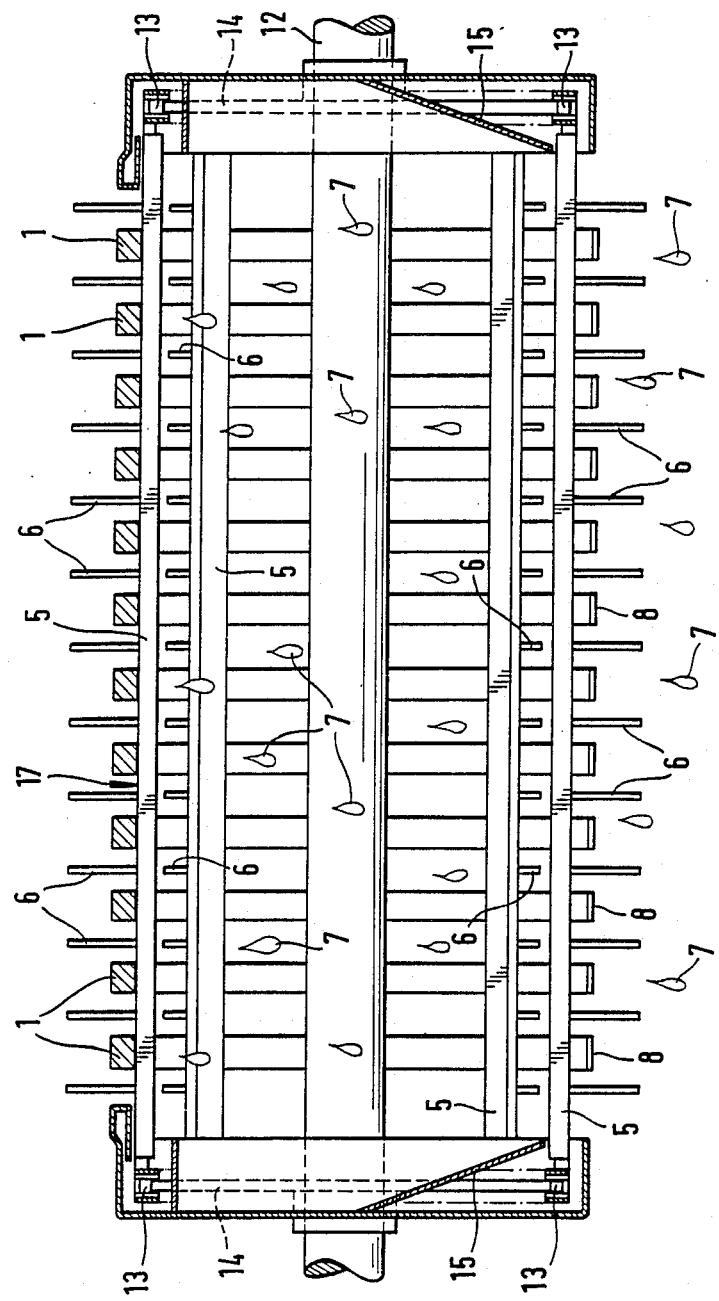
FIG. 2 is an illustration along the section A—A of FIG. 1.

The guide members 6 are advantageously formed such that they project above the grate irons, so that the guide members 6 can also be used for conveying solids in the separating conveyor of the invention. Moreover, while moving in between the grate irons 1, the guide members keep the gaps between the separate grate irons 1 essentially clear of the conveyed solid materials, and thus in part prevent the conveyor from blocking. Thus, according to FIG. 2, the liquid material 7 contained in the conveyed material is free to flow down in between the grate irons 1, wherefrom the said liquid material 7 is conducted further into specific liquid treatment.

In the separating conveyor according to the invention, the top part 8 of the grate irons 1 is advantageously designed so that the conveyed solid materials leaving the conveyor are directed outwards with respect to the conveying path 17 of the conveyor, so that the solid material can be fed without blocking directly into the drop funnel 9. Through the drop funnel 9, the solid material is conducted into further treatment.

In the preferred embodiment shown in FIG. 1, the drum axis or shaft 10 located at the bottom end of the conveyor is placed below the liquid surface 11, and the drum axis or shaft 12 located at the top end of the conveyor is placed above the liquid surface 11. Thus the fenders 15 of the chains 13 and sprocket wheels 14 of the chain-driven conveyor are gapless. In order to regulate the operation of the separating conveyor of the invention, to the axis 12 there is connected a hydraulic variable-speed motor 16 whereby the conveyor speed is advantageously steplessly regulated. Furthermore, the hydraulic motor 16 is advantageously provided with a hydraulic pressure sensor, so that a possible excess pressure in the hydraulic oil interrupts the operation of the conveyor.

The use of the separating conveyor of the invention is not limited to the above described applications only, but the separating conveyor can advantageously be applied to other uses as well. Such uses are for instance the coarse filtering of hazardous waste as well as the coarse separation in water intake plants. In addition to this, the separating conveyor of the invention can be applied in the classification of a solely dry material such as crushed ore, so that a predetermined lump size is advantageously separated into a specific bin.

I claim:

1. A separating conveyor for separating solid substances from liquids, comprising:
 a support structure,
 a movable conveyor member having a conveyor run that extends from a lower end of the conveyor run to an upper end thereof,
 means for driving the conveyor member upwardly along said conveyor run,
 at least two grate irons which are attached to the support structure at the lower end of said conveyor run,
 resilient means urging the grate irons in resiliently yieldable fashion towards said conveyor run, and
 guide members carried by the conveyor member for guiding the grate irons and solid material on the conveyor run.

2. A conveyor according to claim 1, wherein the grate irons define a substantially planar surface and the guide members project above the planar surface.

3. A conveyor according to claim 1, wherein the conveyor member comprises a chain conveyor having transverse beams.

4. A conveyor according to claim 3, wherein the guide members are attached to the transverse beams.

5. A conveyor according to claim 1, further comprising first and second shafts each carrying a pair of wheels, the first shaft being at a greater height than the second shaft, and wherein the conveyor member is endless and is trained about said wheels and has an upper run which constitutes said conveyor run and also has a lower run.

6. A conveyor according to claim 5, wherein the conveyor member comprises two endless parallel chains which are spaced apart along the shafts, and transverse beams connecting the chains.

7. A conveyor according to claim 6, wherein the guide members are attached to the transverse beams.

8. A conveyor according to claim 1, wherein each grate iron is formed with a hole and the grate irons are attached to the support structure by rods that extend through the holes respectively.

9. A conveyor according to claim 8, wherein the resilient means surround the rods respectively.

10. A conveyor according to claim 9, wherein the resilient means comprise compression springs fitted on the rods above the grate irons respectively, whereby the compression springs urge the grate irons towards the conveyor run.

* * * * *